US011188687B2

United States Patent
Esposito et al.

(10) Patent No.: US 11,188,687 B2
(45) Date of Patent: Nov. 30, 2021

(54) RULE COMPLIANCE CHECKING AND DESIGN GENERATION WITH RULE ACCESS SECURITY

(71) Applicant: The Boeing Company, Chicago, IL (US)

(72) Inventors: Christopher Esposito, Issaquah, WA (US); Jeff Alan Heisserman, Clinton, WA (US)

(73) Assignee: The Boeing Company, Chicago, IL (US)

(*) Notice: Subject to any disclaimer, the term of this patent is extended or adjusted under 35 U.S.C. 154(b) by 393 days.

(21) Appl. No.: 16/185,461

(22) Filed: Nov. 9, 2018

(65) Prior Publication Data

US 2020/0151300 A1 May 14, 2020

(51) Int. Cl.
| | |
|---|---|
| *G06F 30/15* | (2020.01) |
| *G06T 17/00* | (2006.01) |
| *G06F 119/18* | (2020.01) |
| *G06F 21/60* | (2013.01) |
| *G06F 30/00* | (2020.01) |
| *G06F 30/20* | (2020.01) |
| *G06F 30/30* | (2020.01) |

(Continued)

(52) U.S. Cl.
CPC .............. *G06F 30/15* (2020.01); *G06T 17/00* (2013.01); *G06F 21/602* (2013.01); *G06F 21/6209* (2013.01); *G06F 30/00* (2020.01); *G06F 30/20* (2020.01); *G06F 30/30* (2020.01); *G06F 30/398* (2020.01); *G06F 2113/16* (2020.01); *G06F 2119/18* (2020.01)

(58) Field of Classification Search
CPC .. G06F 2119/18; G06F 2113/16; G06F 30/00; G06F 30/15; G06F 30/20; G06F 30/30; G06F 21/602; G06F 21/6209; G06F 30/398
See application file for complete search history.

(56) References Cited

U.S. PATENT DOCUMENTS 6,083,269 A * 7/2000 Graef .................... G06F 30/327
703/14
7,444,269 B2 10/2008 Drumheller
(Continued)

OTHER PUBLICATIONS

Heisserman et al., "A Grammatical Approach to Design Generation and its Application to Aircraft Systems," Proceedings of Generative CAD Systems Symposium, Pittsburgh, Pennsylvania, Jul. 12-14, 2004, 17 pages.

(Continued)

*Primary Examiner* — Kibrom K Gebresilassie
(74) *Attorney, Agent, or Firm* — Yee & Associates, P.C.

(57) ABSTRACT

A method and apparatus for checking compliance of a design for a product with design rules. An executable rule module comprising the design rules is received. The design rules comprise design checking rules that specify conditions. Design data representing the design is received. The executable rule module is run using the design data to determine compliance of the design with the design rules by determining whether the design satisfies the conditions. A compliance report to indicate the compliance of the design with the design rules is generated. The design data may be used to manufacture the product in response to a determination that the design complies with the design rules.

20 Claims, 7 Drawing Sheets

(51) Int. Cl.
  G06F 113/16    (2020.01)
  G06F 21/62     (2013.01)
  G06F 30/398    (2020.01)

(56) References Cited

U.S. PATENT DOCUMENTS

| | | | | | |
|---|---|---|---|---|---|
| 7,689,951 | B2* | 3/2010 | Cazeaux | ............... | G06F 30/398 716/106 |
| 9,026,970 | B2* | 5/2015 | Danti | ................... | G06F 30/398 716/112 |
| 9,519,732 | B1* | 12/2016 | Gennari | ................ | G06F 30/398 |
| 10,423,748 | B2* | 9/2019 | Irissou | .................. | G06F 30/392 |
| 10,592,627 | B2* | 3/2020 | Chidambarrao | ...... | G06F 30/398 |
| 2005/0251771 | A1* | 11/2005 | Robles | .................. | G06F 30/367 716/52 |
| 2006/0253813 | A1* | 11/2006 | Rittman | ................ | G06F 30/398 716/52 |
| 2007/0055892 | A1* | 3/2007 | Pikus | .................. | G06F 21/6227 713/189 |
| 2009/0222927 | A1* | 9/2009 | Pikus | .................... | G06F 30/398 726/26 |
| 2010/0146466 | A1* | 6/2010 | Hadley | ................... | G06F 30/15 716/111 |
| 2013/0086541 | A1* | 4/2013 | Luo | ........................ | G06F 30/398 716/112 |
| 2014/0100824 | A1* | 4/2014 | Bess | ........................ | G06F 30/15 703/1 |
| 2014/0268467 | A1* | 9/2014 | Shi | .......................... | G06F 30/39 361/111 |
| 2016/0292066 | A1* | 10/2016 | Stevens | ............... | G06F 11/3604 |

OTHER PUBLICATIONS

Drumheller, "Constraint-Based Design of Optimal Transport Elements," Journal of Computing and Information Science in Engineering, vol. 2, No. 4, Dec. 2002, pp. 302-311.

Heisserman et al., "A design representation to support automated design generation," Proceedings of Artificial Intelligence in Design, Worcester, Massachusetts, Jun. 26-29, 2000, 20 pages.

Heisserman, "Comparing Designs: A Graphical Diff for Digital Mockups," Proceedings of DETC'99, ASME Design Engineering Technical Conferences, Las Vegas, Nevada, Sep. 12-15, 1999, 8 pages.

Heisserman et al., "Representing Relationships in Hierarchical Assemblies," Proceedings of DETC'98, ASME Design Engineering Technical Conferences, Atlanta, Georgia, Sep. 13-16, 1998, 7 pages.

Heisserman et al., "Design Representation Report," Technical Report SSGTECH-98-033, Boeing SSG Applied Research & Technology, Dec. 1998, 16 pages.

Callahan, "Relating Functional Schematics to Hierarchical Mechanical Assemblies," Proceedings of the Fourth Symposium on Solid Modeling and Applications, Atlanta, Georgia, May 1997, 11 pages.

Callahan et al., "A Product Representation to Support Process Automation," Product Modeling for Computer Integrated Design and Manufacture, IFIP Advances in Information and Communication Technology, Springer, Boston, MA, 15 pages.

Heisserman et al., "Interactive Grammatical Design," Artificial Intelligence in Design '96, Workshop Notes on Grammatical Design, Stanford, California, Jun. 24-27, 1996, 4 pages.

Callahan et al., "A Representation for Hierarchical Assemblies," Research and Technology, Boeing Computer Services, 8 pages.

Heisserman, "Generative Geometric Design and Boundary Solid Grammars," Dissertation Submitted in Partial Fulfillment of the Degree of Doctor of Philosophy, Carnegie Mellon University, May 1991, 147 pages.

Heisserman, "Generative Geometric Design," IEEE Computer Graphics and Applications, vol. 14, No. 2, Mar. 1994, pp. 37-45.

Heisserman et al., "Generating Languages of Solid Models," Proceedings of the Second Symposium on Solid Modeling and Applications, Montreal, Quebec, Canada, May 19-21, 1993, pp. 103-113.

Heisserman, "Comparing Assemblies," Solid Modeling '97, Atlanta, Georgia, May 14-16, 1997, 8 pages.

* cited by examiner

RULE COMPLIANCE CHECKING AND DESIGN GENERATION WITH RULE ACCESS SECURITY

BACKGROUND INFORMATION

1. Field

The present disclosure relates generally to design automation systems. More particularly, the present disclosure relates confirming the compliance of designs with design rules. The present disclosure also relates to protecting the technical content of shared design rules used in design automation systems.

2. Background

Automation and optimization tools may be used to design and manage complex designs, families of designs, and design alternatives for complex products. For example, without limitation, such tools may be used to design and manage designs for complex aerospace products, such as aircraft, which may be composed of millions of parts and components. The use of such tools may be necessary or desirable to produce feasible designs, close the development business case, reduce extensive non-recurring engineering costs, and to do so with the goal of breaking the development cost curve.

Collaboration with sets of design rules between partners developing a product may be necessary or desirable. It may be desirable to confirm compliance of the designs developed by the partners in the collaboration with the various design rules. However, the sharing of design rules between partnering entities may pose the risk of undesired disclosure of technical content of the design rules.

Therefore, there may be a need for a method and apparatus that take into account at least some of the issues discussed above, as well as other possible issues.

SUMMARY

In one illustrative embodiment, a method of checking compliance of a design for a product with design rules is provided. An executable rule module comprising the design rules is received. The design rules comprise design checking rules that specify conditions. Design data representing the design is received. The executable rule module is run using the design data to determine compliance of the design with the design rules by determining whether the design satisfies the conditions. A compliance report to indicate the compliance of the design with the design rules is generated. The design data may be used to manufacture the product in response to a determination that the design complies with the design rules.

In another illustrative embodiment, an apparatus comprises a receiver, a design rule compliance checker, and a compliance report generator. The receiver is configured to receive an executable rule module comprising design rules and design data representing a design for a product. The design rules comprise design checking rules that specify conditions. The design rule compliance checker is configured to run the executable rule module using the design data to determine compliance of the design with the design rules by determining whether the design satisfies the conditions. The compliance report generator is configured to generate a compliance report to indicate the compliance of the design with the design rules.

In another illustrative embodiment, another method of checking compliance of a design for a product with design rules is provided. An executable rule module comprising the design rules is generated. A protection level is assigned to the executable rule module comprising the design rules. Security measures are applied to the executable rule module based on the assigned protection level. The executable rule module with the security measures applied is deployed to a user system for checking compliance of a design on the user system with the design rules.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that collaboration with sets of design rules between different entities may be necessary or desirable for the development of complex products. It may be desirable to determine the compliance of designs with various design rules.

Some of the design rules to be shared between partnering entities may encode knowledge that is already widely known and generally useful. However, other sets of design rules may contain highly proprietary knowledge with significant value as intellectual property. It is desirable to protect such proprietary content of design rules from unintended disclosure.

Illustrative embodiments provide a system and method for checking the compliance of designs with design rules in an effective, efficient, and secure manner. In accordance with an illustrative embodiment, design rules may be incorporated in an executable rule module. The executable rule module may be run using design data to compare the design represented by the design data with the design rules. A compliance report then may be generated and displayed to indicate compliance of the design with the design rules.

Illustrative embodiments also provide a comprehensive set of capabilities within a framework for securely protecting the technical contents of design rules and sets of design rules while allowing the shared use of design rules in a design checking, design generation, and design exploration system. Illustrative embodiments provide for the using and sharing of design rules across industry partners and organizations by providing a common framework and the security for sharing design rules while protecting the intellectual property of all sides.

Figure 1:
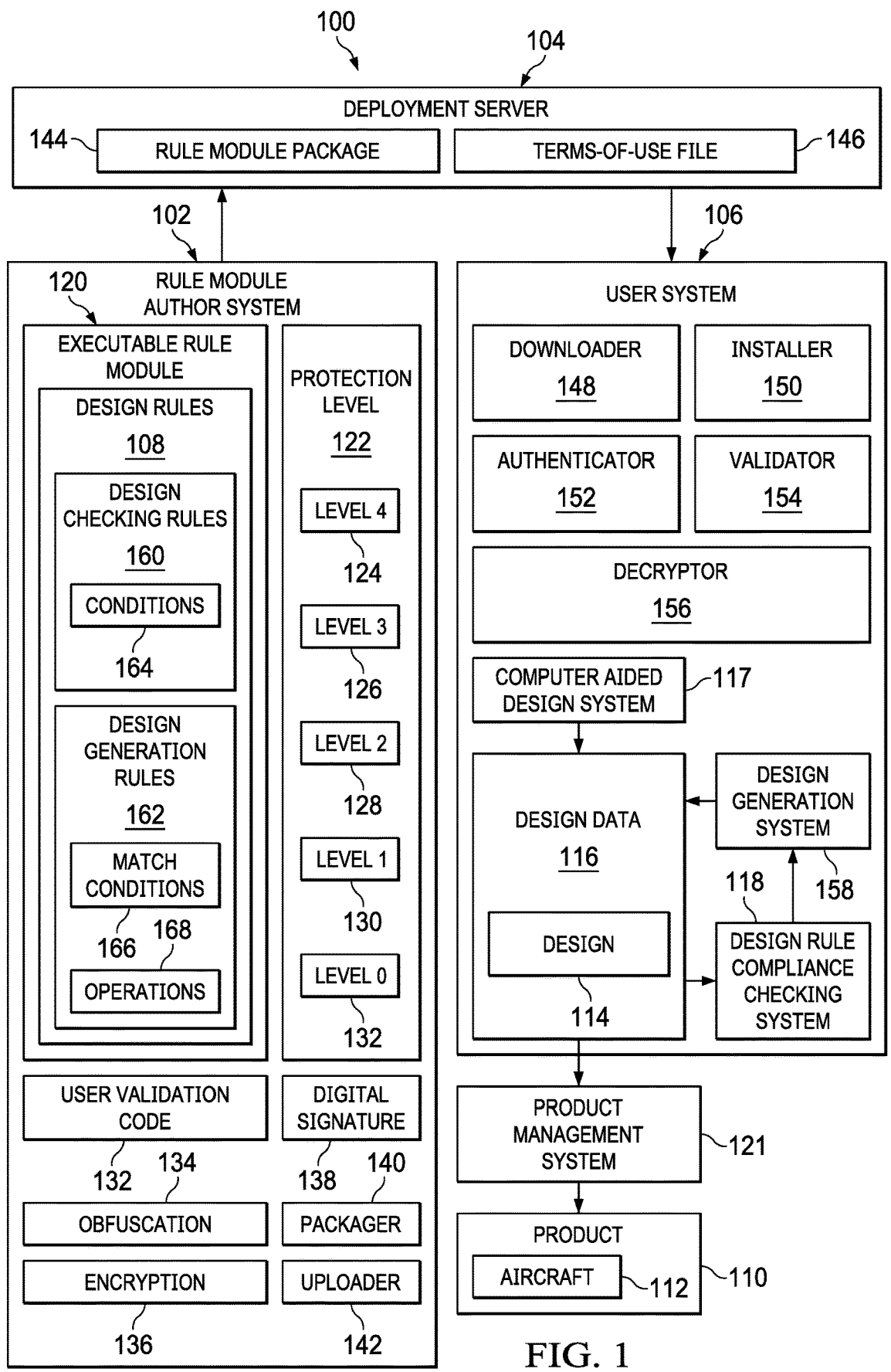
FIG. 1 is an illustration of a block diagram of a design rule sharing system in accordance with an illustrative embodiment.

Turning to FIG. 1, an illustration of a block diagram of a design rule sharing system is depicted in accordance with an illustrative embodiment. Design rule sharing system 100 comprises rule module author system 102, deployment server 104, and user system 106.

Design rules 108 may comprise rules for the designs of any appropriate product 110 or part of product 110. For example, without limitation, design rules 108 may comprise rules for the designs of aircraft 112 or any appropriate part of aircraft 112.

User system 106 may generate design 114 for product 110. Design 114 may be represented in design data 116. For example, without limitation, user system 106 may include computer aided design system 117. In this case, design data 116 may comprise computer aided design model data generated by computer aided design system 117 for design 114.

Compliance of design 114 with design rules 108 may be checked automatically using design rule compliance checking system 118. For example, design rule compliance checking system 118 may be implemented in user system 106. Design rule compliance checking system 118 may run executable rule module 120 comprising design rules 108 using design data 116 to determine compliance of design 114 with design rules 108.

Design 114 may be generated or modified automatically using design rules 108 by design generation system 158. For example, design generation system 158 may run executable rules module 120 to modify design 114 that was determined not to be compliant with design rules 108 to make design 114 compliant with design rules 108.

Design data 116 for design 114 that is determined to be compliant with design rules 108 may be provided to product management system 121 for manufacturing or maintenance of product 110 having design 114. For example, without limitation, design data 116 for design 114 that is determined to be compliant with design rules 108 may be used to control a computer aided manufacturing system in product management system 121.

Rule module author system 102 may be configured for creating executable rule module 120. Executable rule module 120 may comprise any appropriate number of design rules 108. Design rules 108 may include rules for automatically generating, evaluating, or modifying design 114 for aircraft 112 or any other appropriate product 110 or complex system. For example, design rules 108 may include design checking rules 160, design generation rules 162, or both design checking rules 160 and design generation rules 162.

Design checking rules 160 may be used to check design 114 to determine the acceptability of design 114. Design checking rules 160 may define any appropriate number of conditions 164 for design 114. Design 114 that satisfies conditions 164 for design 114 is compliant with design rules 108 and thus may be determined to be an acceptable design. Conditions 164 may define any appropriate characteristics of a design that must be satisfied for the design to be considered an acceptable design that is compliant with design rules 108. The manner in which any particular conditions 164 are represented in design checking rules 160 may depend upon the particular characteristics of conditions 164 and how the presence or absence of conditions 164 in design 114 may be determined from design data 116.

Design generation rules 162 may be used to automatically generate or modify design 114. Design generation rules 162 may include match conditions 166 and operations 168. Match conditions 166 define the characteristics of design 114 that must be present for particular operations 168 to be applied to design 114. Operations 168 specify changes to design 114 to modify design 114 into a desirable form that is compliant with design rules 108. For example, without limitation, operations 168 may add a new element to design 114, remove an element from design 114, replace an element in design 114, or make any other appropriate change or combination of changes to design 114. Operations 168 also may be configured and used to generate alternatives to design 114. Operations 168 may be represented in any appropriate manner in design generation rules 162. For example, operations 168 may be represented based on the manner in which design 114 is represented in design data 116 such that performing operations 168 will modify design data 116 in an appropriate manner to implement the desired changes in design 114.

Design rules 108 in executable rule module 120 are executable. For example, design checking rules 160 may be executable by design rule compliance checking system 118 on user system 106 to evaluate design 114 made by a user using computer aided design system 117. Design generation rules 162 may be executable by design generation system 158 to generate or modify design 114.

Design rules 108 within executable rule module 120 may be assigned protection level 122. Security measures are applied to executable rule module 120 based on protection level 122 assigned to executable rule module 120. The security measures applied to executable rule module 120 control the degree to which a user of executable rule module 120 is able to access information about design rules 108 in executable rule module 120 or to access or modify design rules 108 in executable rule module 120.

Protection level 122 may be selected from a plurality of different protection levels corresponding to various different security measures that may be applied to executable rule module 120. For example, without limitation, protection level 122 may be level 4 124, level 3 126, level 2 128, level 1 130, or level 0 132. Different illustrative embodiments may have more or fewer protection levels. The names of the protection levels are arbitrary.

Examples of the information that is accessible to a user of executable rule module 120 at each of the example protection levels is described below. In this example, the amount of information revealed increases cumulatively as the protection level decreases. Appropriate security measures may be applied to executable rule module 120 to control the amount of information that is accessible to a user as defined by each protection level.

At protection level 4 124, no information about design rules 108 in executable rule module 120 is revealed to a user of executable rule module 120. At this protection level, design rules 108 in executable rule module 120 are provided in executable form only. Appropriate security measures may be applied at this protection level such that a user is able to run the executable code for design rules 108 but otherwise is prevented from opening executable rule module 120 to see the names of design rules 108 or any other information about design rules 108 that are contained therein. Alternatively, or in addition, at this security level, the names of design rules 108 in executable rule module 120 may be obfuscated in any appropriate manner such that a user of executable rule module 120 cannot obtain any useful information about design rules 108 contained therein.

At protection level 3 126, design rules 108 in executable rule module 120 are provided in executable form only. Appropriate security measures may be applied at this protection level such that a user of executable rule module 120 may be able to see the names of design rules 108 in executable rule module 120 and a description of what design rules 108 do.

At protection level 2 128, appropriate security measures may be applied to allow a user of executable rule module 120 to see the information revealed at protection level 3 126 plus a description of how design rules 108 in executable rule module 120 operate.

At protection level 1 130, appropriate security measures may be applied to allow a user of executable rule module 120 to see the information revealed at protection level 2 128 plus the query code that describes how to find where the rule applies, that is, the code for the match condition. Security measures at this protection level thus may allow a user of executable rule module 120 to see a portion of the source code for design rules 108 without allowing the user to modify that code.

At protection level 0 132, appropriate security measures may be applied to allow a user of executable rule module 120 to see the information revealed at level 1 130 plus the code that describes how to modify the design, that is, the code for rule operation. Security measures at this protection level thus may allow a user of executable rule module 120 both to see and modify a portion of the source code for design rules 108.

As an alternative to the cumulative scheme described, the rule information that may be revealed at each protection level 122 may be specified in a matrix. In this case, individual protection levels may be provided for all combinations of controls for viewing the rule information in executable rule module 120 as well as accessing the code in executable rule module 120.

The same protection level 122 may apply to all rules in executable rule module 120. Alternatively, different protection levels may be specified for each of the rules in executable rule module 120.

Authorization restrictions may be based on multiple factors in any appropriate combination. Examples of such restrictions may include, without limitation: date and time within a specified range, organization (for example, from a web directory service), authorization group (for example, from a web directory service), token or license or certificate issued from an authorizing organization, network location within a specified domain or sub-domain, location (for example within a geoposition boundary for location aware devices).

Rule module author system 102 may be configured to include user validation code 132 in executable rule module 120.

Rule module author system 102 may be configured to provide obfuscation 134 and encryption 136 of portions of executable rule module 120 based on protection level 122.

Rule module author system 102 may be configured to sign executable rule module 120 with digital signature 138. Packager 140 may be configured to package executable rule module 120 in an appropriate manner to form rule module package 144. Uploader 142 may be configured to upload rule module package 144 to deployment server 104 from rule module author system 102.

Rule module package 144 may be retrieved from deployment server 104 by user system 106. Terms-of-use file 146 also may be retrieved from deployment server 104 by user system 106. Terms-of-use file 146 may set forth the terms under which a user may use rule module package 144, including describing security measures in place for rule module package 144.

User system 106 may include downloader 148 for downloading rule module package 144 and terms-of-use file 146 from deployment server 104. User system 106 also may include installer 150 for installing rule module package 144 on user system 106. User system 106 also may include authenticator 152, validator 154, and decryptor 156 for authenticating, validating, and decrypting rule module package 144 before running rule module package 144 on user system 106.

The illustration of design rule sharing system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, design rule compliance checking system 118 may be implemented as part of product management system 121 that may be a part of user system 106 or separate from user system 106. For example, without limitation, design rule compliance checking system 118 may be implemented in a control system for controlling a manufacturing system or a maintenance system in product management system 121.

Figure 2:
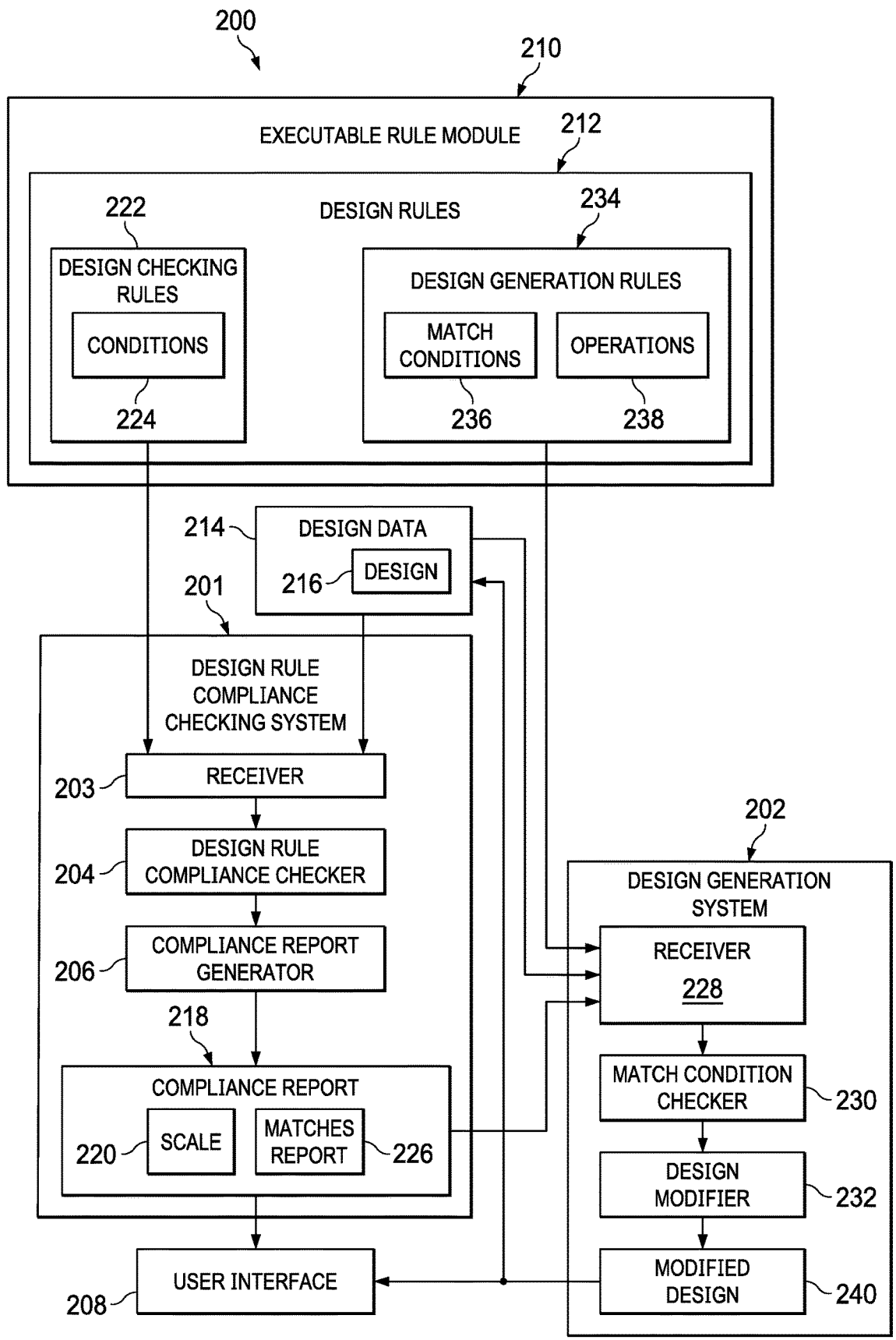
FIG. 2 is an illustration of a block diagram of a design rule compliance checking and generation system in accordance with an illustrative embodiment.

Turning to FIG. 2, an illustration of a block diagram of a design rule compliance checking and generation system is depicted in accordance with an illustrative embodiment. Design rule compliance checking and generation system 200 may include design rule compliance checking system 201 and design generation system 202. Alternatively, a system in accordance with an illustrative embodiment may include either design rule compliance checking system 201 or design generation system 202. Design rule compliance checking system 201 may be an example of one implementation of design rule compliance checking system 118 in FIG. 1. Design generation system 202 may be an example of one implementation of design generation system 158 in FIG. 1.

Design rule compliance checking system 201 may include receiver 203, design rule compliance checker 204, compliance report generator 206, and user interface 208. Receiver 203 may be configured to receive executable rule module 210 comprising design rules 212. For example, receiver 203 is configured to receive design rules 212 comprising design checking rules 222 including conditions 224. Receiver 203 also may be configured to receive design data 214 representing design 216.

Design rule compliance checker 204 may be configured to run executable rule module 210 using design data 214 to compare design 216 to design rules 212 to determine compliance of design 216 with design rules 212. For example, design rule compliance checker 204 may be configured to run executable rule module 210 to determine whether design 216 satisfies conditions 224 defined in design checking rules 222.

Compliance report generator 206 may be configured to generate compliance report 218 for presentation to a user on user interface 208. Compliance report 218 may indicate compliance of design 216 with design rules 212 as determined by design rule compliance checker 204 in any appropriate manner. For example, without limitation, compliance report 218 may include matches report 226. Matches report 226 may indicate conditions 224 specified in design checking rules 222 that are satisfied by design 216, conditions 224 that are not satisfied by design 216, or both. Matches report 226 may include a graphical representation of design 216 in which components of design 216 that match conditions 224 are highlighted or otherwise indicated in a different manner from components of design 216 that do not match conditions 224. Compliance report 218 may indicate compliance of design 216 with design rules 212 on scale 220. For example, compliance report 218 may indicate whether design 216 is non-compliant with design rules 212, partially compliant with design rules 212, or fully compliant with design rules 212.

Design generation system 202 may include receiver 228, match condition checker 230, design modifier 232, and user interface 208. Receiver 228 may be configured to receive executable rule module 210 comprising design rules 212. For example, receiver 228 is configured to receive design rules 212 comprising design generation rules 234 including match conditions 236 and operations 238. Receiver 228 also may be configured to receive design data 214 representing design 216. Receiver 228 also may be configured to receive compliance report 218 indicating portions of design 216 that may not comply with design rules 212.

Match condition checker 230 may be configured to use match conditions 236 to match portions of design 216 to be modified to appropriate operations 238. Match condition checker 230 may determine when match conditions 236 are satisfied for applying particular operations 238 to modify design 216.

Design modifier 232 may be configure to perform operations 238 identified by match condition checker 230 to modify design 216. Modified design 240 generated by design modifier 232 may be displayed to a user on user interface 208. Modified design 240 also may be saved as a replacement to design 216 that was modified.

Figure 3:
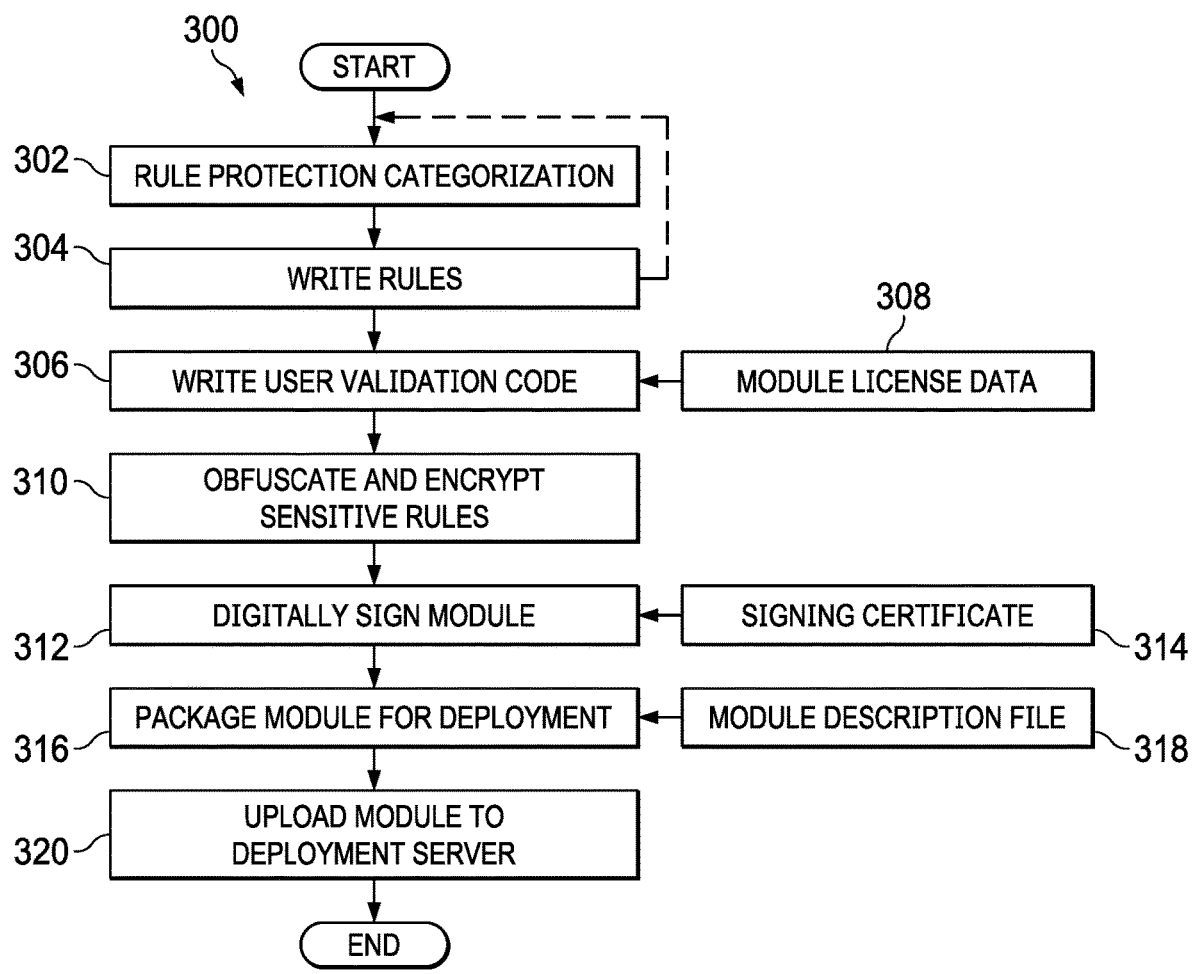
FIG. 3 is an illustration of a flowchart of a method of providing design rule security in accordance with an illustrative embodiment.

Turning to FIG. 3, an illustration of a flowchart of a method of providing design rule security is depicted in accordance with an illustrative embodiment. Method 300 may be implemented, for example, in rule module author system 102 in FIG. 1.

Method 300 may begin with rule protection categorization (operation 302). Existing design rules may be assigned appropriate protection levels as part of operation 302. New design rules may be written (operation 304). Each design rule written in operation 304 may be assigned a protection level as appropriate as part of rule protection categorization operation 302.

User validation code may be written (operation 306) using module license data 308. In accordance with the protection level assigned to a design rule in operation 302, sensitive design rules may be obfuscated and encrypted as appropriate (operation 310). The executable rule module may be digitally signed (operation 312) with signing certificate 314. The executable rule module then may be packaged for deployment (operation 316) using module description file 318. The packaged executable rule module then may be uploaded to the deployment server (operation 320), with the process terminating thereafter.

Figure 4:
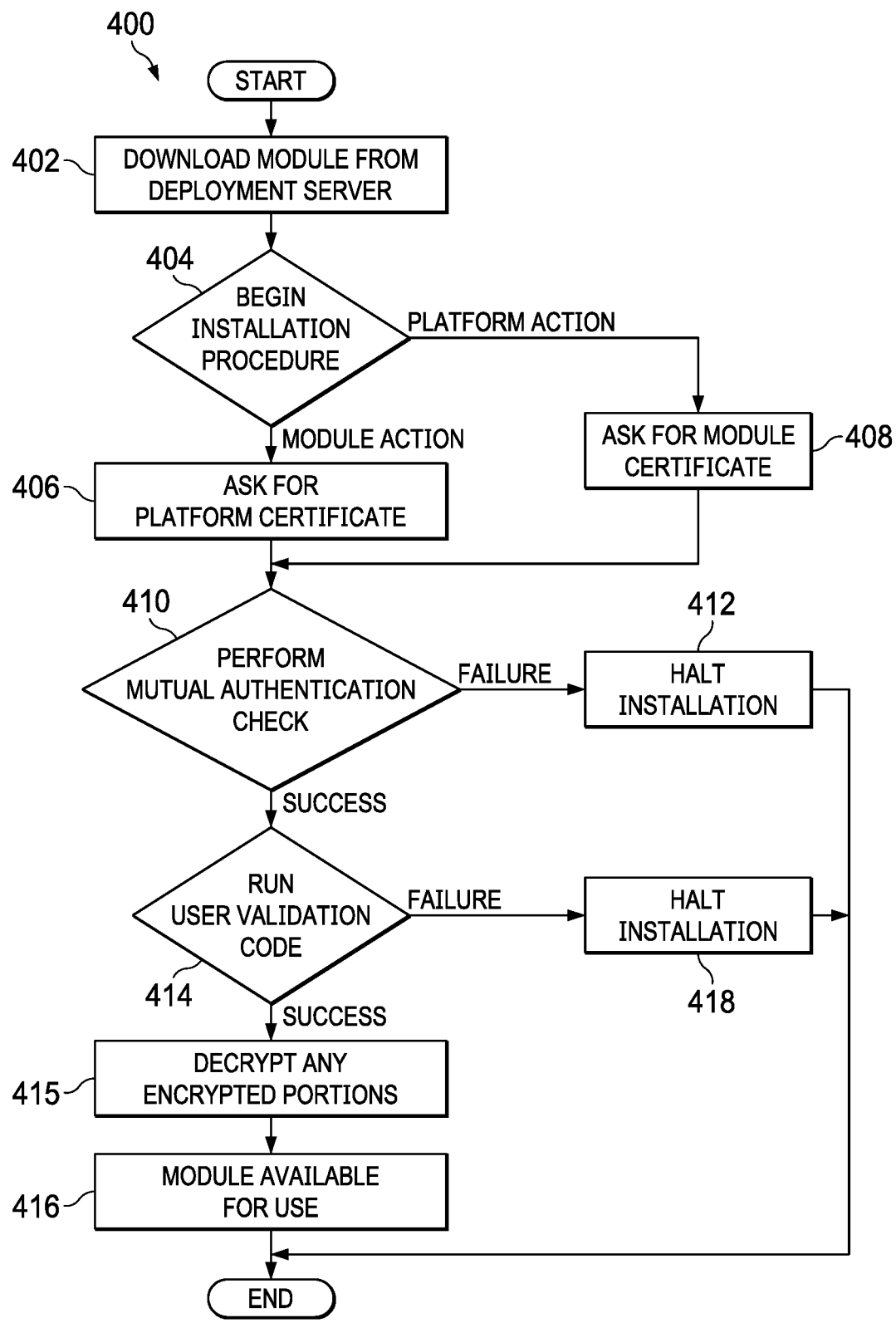
FIG. 4 is an illustration of a flowchart of a method of design rule security performed by a user system in accordance with an illustrative embodiment.

Turning to FIG. 4, an illustration of a flowchart of a method of design rule security performed by a user system is depicted in accordance with an illustrative embodiment. Method 400 may be implemented, for example, on user system 106 in FIG. 1.

Method 400 may begin with downloading the executable rule module from the deployment server (operation 402). After downloading the executable rule module, an installation procedure may begin (operation 404). As part of the installation procedure a platform certificate is requested (operation 406) and a module certificate is requested (operation 408). A mutual authentication check then may be performed (operation 410). In response to a failure of the mutual authentication check at operation 410 the installation is halted (operation 412), with the process terminating thereafter.

In response to a successful mutual authentication check at operation 410, the user validation code may be run (operation 414). In response to successful user validation at operation 414, any encrypted portions are decrypted (operation 415) and the executable rule module is available for use (operation 416), with the process terminating thereafter. In response to a failure to validate the user at operation 414, the installation is halted (operation 418), with the process terminating thereafter.

Figure 5:
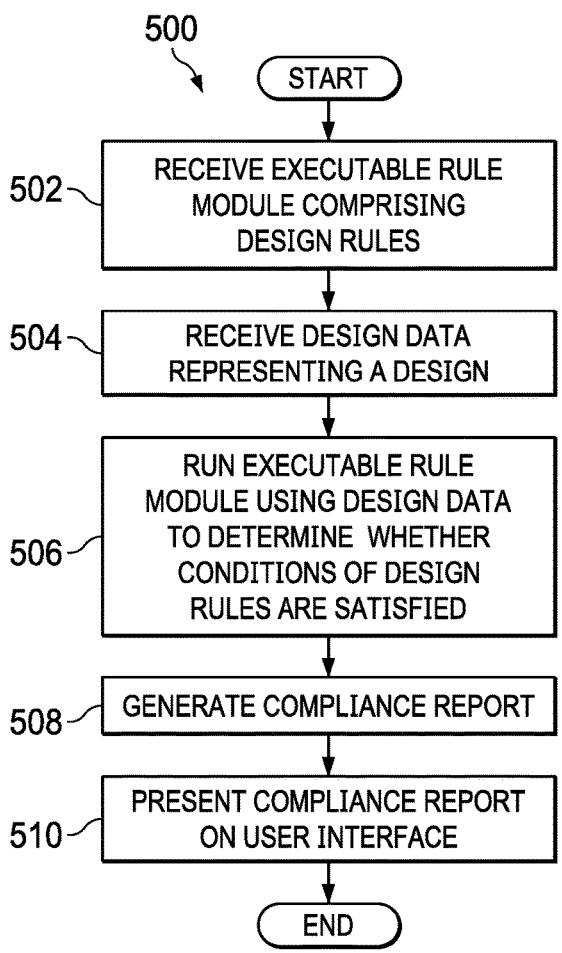
FIG. 5 is an illustration of a flowchart of a method of checking compliance of a design with a design rule in accordance with an illustrative embodiment.

Turning to FIG. 5, an illustration of a flowchart of a method of checking compliance of a design with a design rule is depicted in accordance with an illustrative embodiment. Method 500 may be implemented, for example, in design rule compliance checking system 118 in FIG. 1.

Method 500 may begin with receiving an executable rule module comprising design rules (operation 502). Design data representing a design to be evaluated also may be received (operation 504). The executable rule module then may be run using the design data to compare the design to the design rules to determine compliance of the design with the design rules (operation 506). A compliance report indicating compliance of the design with the design rules then may be generated (operation 508). The compliance report may then be presented to a user on a user interface (operation 510), with the process terminating thereafter.

Figure 6:
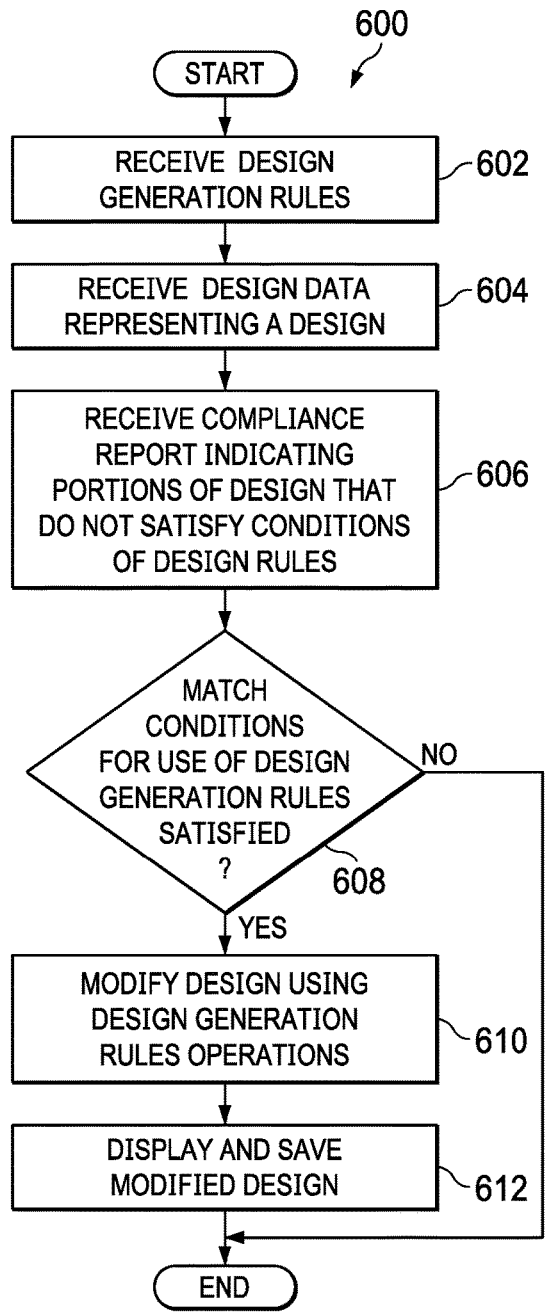
FIG. 6 is an illustration of a flowchart of a method of modifying a design with a design rule in accordance with an illustrative embodiment.

Turning to FIG. 6, an illustration of a flowchart of a method of modifying a design with a design rule is depicted in accordance with an illustrative embodiment. Method 600 may be implemented, for example in design generation system 158 in FIG. 1.

Method 600 may begin with receiving design generation rules (operation 602). The received design generation rules may include match conditions and operations. Design data representing a design to be modified also may be received (operation 604). A compliance report indicating portions of the design that do not satisfy conditions of design rules also may be received (operation 606).

It then may be determined whether any of the match conditions for use of the design generation rules are satisfied by the portions of the design that need to be modified (operation 608). In response to a determination at operation 608 that the match conditions are satisfied, the design may be modified automatically using the design generation rules operations (operation 610). The modified design may then be displayed to a user and saved (operation 612), with the process terminating thereafter. In response to a determination at operation 608 that none of the match conditions are satisfied, the process may terminate.

Figure 7:
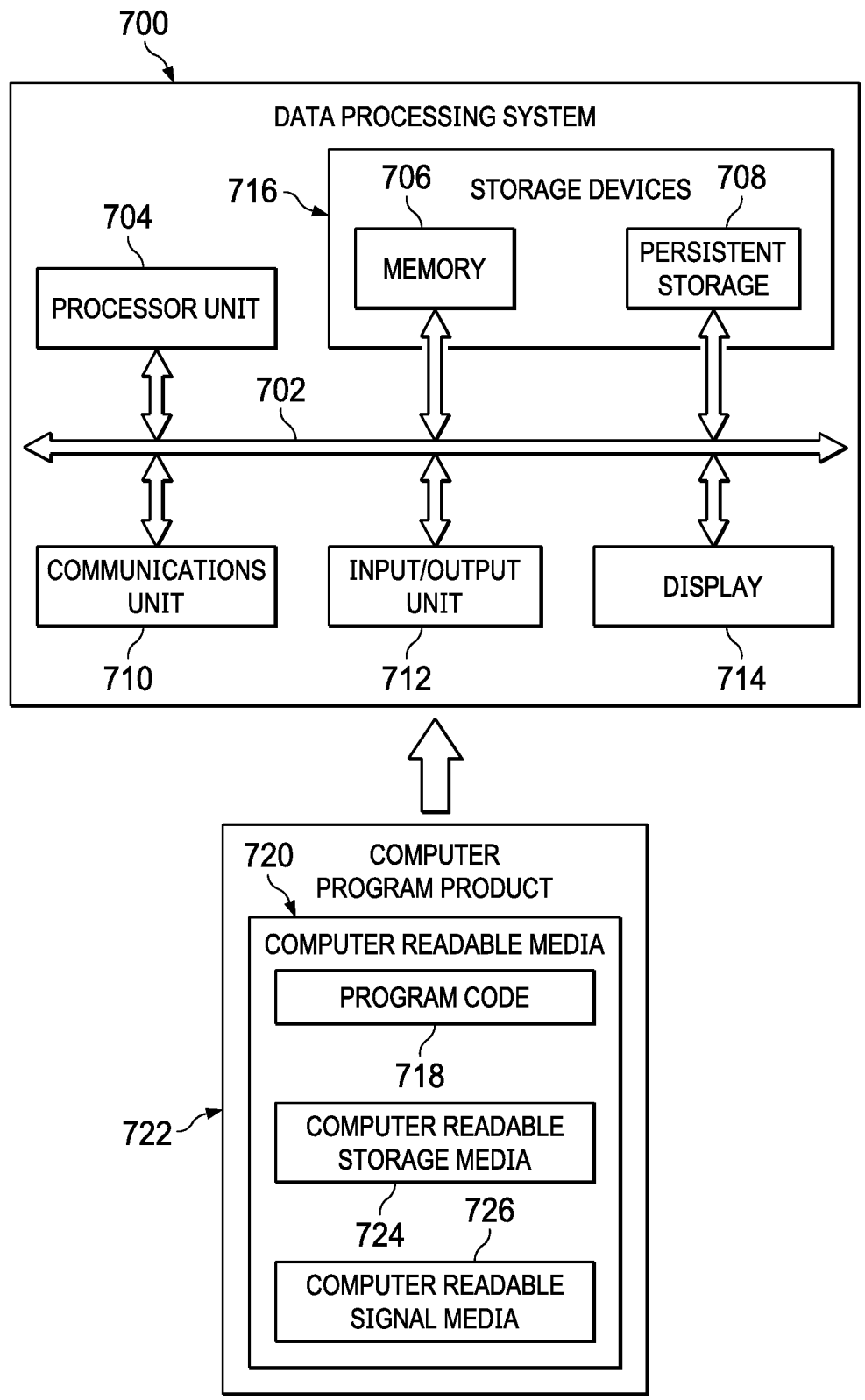
FIG. 7 is an illustration of a block diagram of a data processing system in accordance with an illustrative embodiment.

Turning to FIG. 7, an illustration of a block diagram of a data processing system is depicted in accordance with an illustrative embodiment. Data processing system 700 is an example of one possible implementation of a data processing system for implementing rule module author system 102 or user system 106 in FIG. 1 or design rule compliance checking and generation system 200 in FIG. 2.

In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

Figure 8:
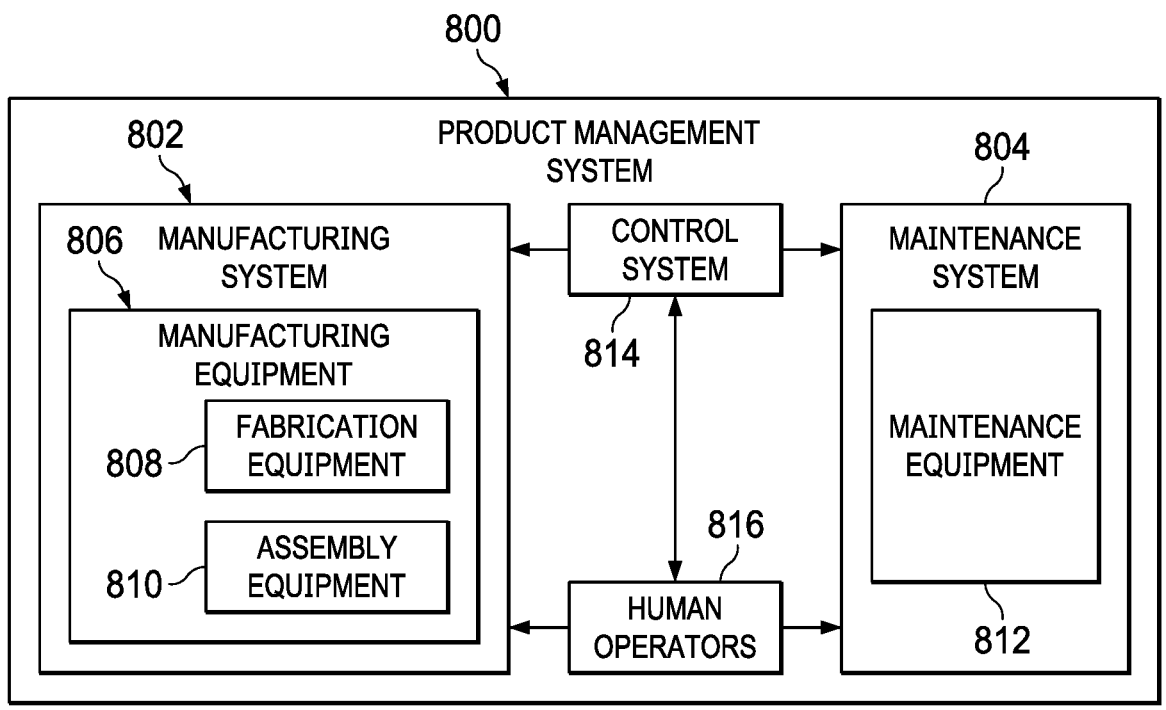
FIG. 8 is an illustration of a block diagram of a product management system in accordance with an illustrative embodiment.

Turning now to FIG. 8, an illustration of a block diagram of a product management system is depicted in accordance with an illustrative embodiment. Product management system 800 is an example of one implementation of product management system 121 in design rule sharing system 100 in FIG. 1. Product management system 800 is a physical hardware system. In this illustrative example, product management system 800 may include at least one of manufacturing system 802 or maintenance system 804.

Manufacturing system 802 is configured to manufacture product 110, such as aircraft 112 in FIG. 1. As depicted, manufacturing system 802 includes manufacturing equipment 806. Manufacturing equipment 806 includes at least one of fabrication equipment 808 or assembly equipment 810.

Fabrication equipment 808 is equipment that may be used to fabricate product 110, such as components for parts used to form aircraft 112. For example, fabrication equipment 808 may include machines and tools. These machines and tools may be at least one of a drill, a hydraulic press, a furnace, a mold, a composite tape laying machine, a vacuum system, a lathe, or other suitable types of equipment. Fabrication equipment 808 may be used to fabricate at least one of metal parts, composite parts, semiconductors, circuits, fasteners, ribs, skin panels, spars, antennas, or other suitable types of parts.

Assembly equipment 810 is equipment used to assemble product 110, such as parts to form aircraft 112. In particular, assembly equipment 810 may be used to assemble components and parts to form aircraft 112. Assembly equipment 810 also may include machines and tools. These machines and tools may be at least one of a robotic arm, a crawler, a faster installation system, a rail-based drilling system, a robot, or other suitable types of equipment. Assembly equipment 810 may be used to assemble parts such as seats, horizontal stabilizers, wings, engines, engine housings, landing gear systems, and other parts for aircraft 112.

In this illustrative example, maintenance system 804 includes maintenance equipment 812. Maintenance equipment 812 may include any equipment needed to perform maintenance on product 110, such as aircraft 112. Maintenance equipment 812 may include tools for performing different operations on product 110, such as on parts on aircraft 112. For example, without limitation, these operations may include at least one of disassembling parts, refurbishing parts, inspecting parts, reworking parts, manufacturing placement parts, or other operations for performing maintenance on aircraft 112. These operations may be for routine maintenance, inspections, upgrades, refurbishment, or other types of maintenance operations.

In the illustrative example, maintenance equipment 812 may include ultrasonic inspection devices, x-ray imaging systems, vision systems, drills, crawlers, and other suitable device. In some cases, maintenance equipment 812 may include fabrication equipment 808, assembly equipment 810, or both to produce and assemble parts that may be needed for maintenance.

Product management system 800 also includes control system 814. Control system 814 is a hardware system and may also include software or other types of components. Control system 814 is configured to control the operation of at least one of manufacturing system 802 or maintenance system 804. In particular, control system 814 may control the operation of at least one of fabrication equipment 808, assembly equipment 810, or maintenance equipment 812.

The hardware in control system 814 may include computers, circuits, networks, and other types of equipment. The control may take the form of direct control of manufacturing equipment 806. For example, robots, computer-controlled machines, and other equipment may be controlled by control system 814. In other illustrative examples, control system 814 may manage operations performed by human operators 816 in manufacturing or performing maintenance on product 110, such as aircraft 112. For example, control system 814 may assign tasks, provide instructions, display models, or perform other operations to manage operations performed by human operators 816. In these illustrative examples, design rule compliance checking system 118 from FIG. 1 may be implemented in control system 814 to manage at least one of the manufacturing or maintenance of product 110, such as aircraft 112 in FIG. 1.

In the different illustrative examples, human operators 816 may operate or interact with at least one of manufacturing equipment 806, maintenance equipment 812, or control system 814. This interaction may be performed to manufacture product 110, such as aircraft 112.

Of course, product management system 800 may be configured to manage product 110 other than aircraft 112. Although product management system 800 has been described with respect to manufacturing in the aerospace industry, product management system 800 may be configured to manage products for other industries. For example, product management system 800 may be configured to manufacture products for the automotive industry as well as any other suitable industries.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of checking compliance of a design for a product with design rules, comprising:
    receiving, by a processor in a data processing system, an executable rule module comprising the design rules, wherein the design rules comprise design checking rules that specify conditions, wherein the executable rule module comprises program instruction and is executable by the processor, and wherein the design rules comprise design generation rules including operations for modifying the design;
    authenticating, by the processor, the executable rule module based on one or more digital certificates;
    receiving, by the processor, design data representing the design;
    running the executable rule module on the processor using the design data to determine compliance of the design with the design rules by determining whether the conditions are satisfied by the design;
    generating, by the processor, a compliance report to indicate the compliance of the design with the design rules;
    executing program instructions in the executable rule module to modify the design data to comply with the design rules of the executable rule module; and
    using the design data to manufacture the product in response to a determination that the design complies with the design rules.

2. The method of claim 1, wherein the design data comprises computer aided design model data.

3. The method of claim 1, wherein the compliance report indicates compliance of the design with the design rules on a scale.

4. The method of claim 1, wherein a protection level is assigned to the executable rule module.

5. The method of claim 4, wherein information in the compliance report is determined based on the protection level assigned to the executable rule module.

6. The method of claim 4, wherein the protection level is selected from:
    a first protection level wherein the design rules are provided in the executable rule module in executable form only and a security measure applied to the executable rule module prevents a user of the executable rule module from opening the executable rule module to access information about the design rules or obfuscates information about the design rules;
    a second protection level wherein the design rules are provided in the executable rule module in executable form only and the security measure applied to the executable rule module allows the user of the executable rule module to access information about the design rules; and
    a third protection level wherein the security measure applied to the executable rule module allows the user of the executable rule module to view source code for the design rules but not to modify the design rules.

7. The method of claim 1, wherein the design rules are design rules for an aircraft.

8. An apparatus, comprising:
    a receiver configured to receive an executable rule module comprising design rules and design data representing a design for a product, wherein the design rules comprise design checking rules that specify conditions, wherein the executable rule module comprises program instructions and is executable by a processor of a data processing system, and wherein the design rules comprise design generation rules including operations for modifying the design;
    an authenticator configured to authenticate the executable rule module based on one or more digital certificates;
    a design rule compliance checker configured to run, by the processor, the executable rule module using the design data to determine compliance of the design with the design rules by determining whether the conditions are satisfied by the design;
    a compliance report generator configured to generate, by the processor, a compliance report to indicate the compliance of the design with the design rules; and
    a design modifier configured to execute, nu the processor, program instructions in the executable rule module to modify the design data to comply with the design rules of the executable rule module.

9. The apparatus of claim 8, wherein the design data comprises computer aided design model data.

10. The apparatus of claim 8, wherein the compliance report indicates compliance of the design with the design rules on a scale.

11. The apparatus of claim 8, wherein a protection level is assigned to the executable rule module.

12. The apparatus of claim 11, wherein information in the compliance report is determined based on the protection level assigned to the executable rule module.

13. The apparatus of claim 11, wherein the protection level is selected from:
  a first protection level wherein the design rules are provided in the executable rule module in executable form only and a security measure applied to the executable rule module prevents a user of the executable rule module from opening the executable rule module to access information about the design rules or obfuscates information about the design rules;
  a second protection level wherein the design rules are provided in the executable rule module in executable form only and the security measure applied to the executable rule module allows the user of the executable rule module to access information about the design rules; and
  a third protection level wherein the security measure applied to the executable rule module allows the user of the executable rule module to view source code for the design rules but not to modify the design rules.

14. The apparatus of claim 8, wherein the design rules are design rules for an aircraft.

15. A computer-implemented method of checking compliance of a design for a product with design rules, comprising:
  generating an executable rule module comprising the design rules, wherein the executable rule module comprises program instructions and is executable by a processor of a data processing system, and wherein the design rules comprise design generation rules including operations for modifying the design, wherein the executable rule module is configured to be authenticated by use of one or more digital certificates;
  assigning, by the processor, a protection level to the executable rule module;
  applying, by the processor, a security measure to the executable rule module based on the protection level assigned to the executable rule module; and
  deploying, by the processor, the executable rule module with the security measure applied to a user system, coupled with the processor, for checking compliance of the design on the user system with the design rules.

16. The method of claim 15, wherein the executable rule module is configured to run on the user system to:
  compare the design to the design rules to determine compliance of the design with the design rules; and
  generate a compliance report to indicate the compliance of the design with the design rules.

17. The method of claim 16, wherein information in the compliance report is generated based on the protection level assigned to the executable rule module.

18. The method of claim 15, wherein the protection level assigned to the executable rule module is selected from:
  a first protection level wherein the design rules are provided in the executable rule module in executable form only and the security measure applied to the executable rule module prevents a user of the executable rule module from opening the executable rule module to access information about the design rules or obfuscates information about the design rules;
  a second protection level wherein the design rules are provided in the executable rule module in executable form only and the security measure applied to the executable rule module allows the user of the executable rule module to access information about the design rules; and
  a third protection level wherein the security measure applied to the executable rule module allows the user of the executable rule module to view source code for the design rules but not to modify the design rules.

19. The method of claim 16 wherein the design rules comprise design generation rules including operations for modifying the design and wherein the executable rule module is further configured to run on the user system to modify the design to comply with the design rules of the executable rule module.

20. The method of claim 15, wherein the design rules are design rules for an aircraft.

* * * * *